Dec. 15, 1942.  R. M. MICHAELS  2,305,438
FAUCET
Filed Jan. 23, 1940
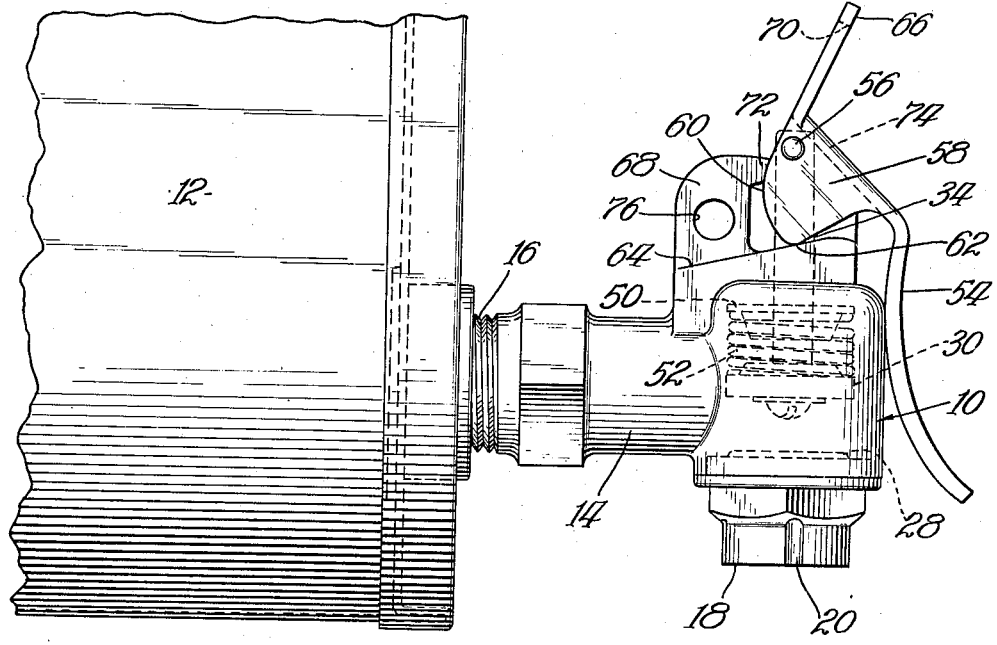
Fig. 1.
Fig. 2.
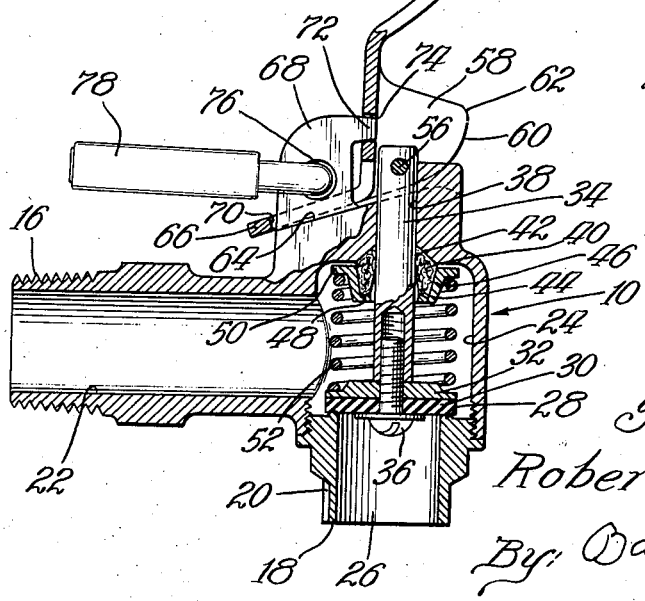
Inventor:
Robert M. Michaels
By Bair & Freeman
Attys.

Patented Dec. 15, 1942

2,305,438

UNITED STATES PATENT OFFICE 2,305,438

FAUCET

Robert M. Michaels, Chicago, Ill., assignor to The Imperial Brass Manufacturing Company, Chicago, Ill., a corporation of Illinois Application January 23, 1940, Serial No. 315,218

6 Claims. (Cl. 251—132)

My invention relates to faucets and particularly those of a type used to draw liquids from containers as, for example, barrels, kegs, drums and the like.

Among the objects of my invention is to provide a new and improved rapid flowing faucet which is capable of passing a large volume of liquid and which is comprised of relatively few parts in novel arrangement so that the action is quick, direct and efficient.

Another object of my invention is to provide a quick flowing liquid faucet wherein the valve is actuated by a lever-like handle which can be used to lock the valve in opened or flowing position.

Still another object of my invention is to provide a new and improved faucet for handling liquids wherein the valve mechanism which is actuated by a somewhat lever-like handle can be locked in closed position and which includes parts on both the body of the valve and the actuating mechanism which become and are held engaged in closed position for the valve in such a manner that the valve cannot be tampered with in any way to force even small amounts of liquid to flow through it.

Still another object of my invention is to provide a new and improved faucet for passing liquids which has a direct acting valve mechanism actuated by means of coacting cam faces on a handle having portions at opposite ends so that the handle cannot be moved past a predetermined closed position in one direction and which upon movement of the handle in the opposite direction locks the handle in open position for the valve when the handle itself comes into contact with the body of the valve.

A further object is to provide a new and improved faucet having inlet and outlet passages and a chamber connecting said passages in which a valve mechanism is positioned for controlling the flow therethrough, the valve mechanism being such that an actuating stem extends outward from the casing at a point where liquid within the faucet is under pressure, the stem being provided with a novel friction packing spring pressed into position by the same spring which normally holds the valve in closed position and so arranged that only a necessary relatively small area of contact is maintained between the packing and the stem in order to efficiently prevent leakage of the liquid outward from the valve but at the same time minimize frictional drag upon the stem.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a side elevational view of the faucet shown with the handle in valve open position.

Figure 2 is a side view of the faucet in section showing the valve and handle in position wherein the faucet is locked in a closed position.

In the provision of small faucets of what may be termed the spigot type, several problems confront the manufacturer. One is the necessity of providing a small inexpensive faucet which has a tightly closing valve of the type which will hold motor oil, for example, but at the same time one which when open will pass a relatively large quantity of the liquid. Various kinds of faucets for this purpose have been used in the past and while many have been designed with faucet seats capable of effectively closing against the flow of oil, the internal construction necessary to produce an efficient closing has rendered them inefficient in passing large quantities of sluggish viscous liquids such as fuel and lubricating oils.

When faucets of this kind particularly are used in service stations where attendants must work rapidly in filling small vessels with lubricating oil to attend the wants of waiting motorists, quick flowing faucets are highly essential.

In addition, it has been found in the past that unless a faucet which frequently is attached to barrels and drums outside the station is made tamper-proof strangers during closing hours are able to manipulate the faucet and open it even though only a slight amount by either lifting on the valve stem itself or by projecting an instrument such as a screw driver against the face of the valve to rob the container of a considerable quantity of the liquid over a period of time.

In order to overcome these difficulties, the applicant has provided a faucet and in the embodiment thereof chosen to illustrate the invention the faucet identified by the character 10 is shown attached to the lower side of the head of a drum 12. The faucet itself comprises a body 14 having a threaded inlet 16 designed to be screwed into the bunghole of a drum and an outlet end 18 which can be inserted into a small vessel for filling purposes.

Grooves 20 at the outlet are for the purpose of permitting air to pass from the vessel when it is being filled.

As will be seen from the drawing, the outlet end 18 is threadably attached to the body in order to give access to the inside of the valve to permit replacement when necessary of any parts therein.

Liquid enters through an inlet passage 22 from which it passes to a valve chamber 24 and thence outward through an outlet pasage 26. In the outlet passage there is an annular shoulder 28 forming a valve seat. A valve member 30, usually of soft material, is provided for seating upon the valve seat and this valve member is shown backed with a stiffening disc 32.

A stem 34 is secured to the valve member by means of a screw 36. The stem extends upward as shown on the drawing through an aperture 38 in the body of the valve so that it projects a short distance beyond the outer surface of the body.

To prevent liquid from leaking past the stem there is provided an annular ring 40 preferably of resilient material forming a friction packing. This ring is narrow at the upper end where it is received in a recess 42 in the body and has a narrow passage fitting snugly about the stem. At its lower end 44 the ring is flared outward so that the inner surface is free from the stem.

An annular ferrule 46 is provided surrounding the ring and this ferrule in turn has a recess 48 adapted to receive the flared lower end of the ring and hold it in its outwardly flared position. The ferrule likewise has an annular ring-like portion 50 which forms a bearing for a coiled spring 52 which finds a bearing at its other end upon the rigid backing 32. The spring normally tends to expand, thereby simultaneously pressing the valve to a closed position and pressing the frictional packing to a sealed position against the stem.

As will be noted, the sealing takes place at a relatively small area around the upper portion of the ring and as wear takes place the ferrule urges the ring upwards so that the seal may be maintained without unduly expanding the area of contact.

For actuating the valve there is provided a handle 54 which is curved at one end and which is pivoted by means of a pin 56 to the upper end of the valve stem. The pin in fact passes through opposite downwardly turned wings 58 on the handle. These wings in turn are curved forming a cam face 60 which terminates in a rounded front corner 62. On the body there is provided a rearwardly sloping pair of shoulders 64 cooperable with the cam surface.

In closed position for the valve as shown in Figure 2 the rear ends of the cam surfaces lie upon the shoulders. When the handle 54 is moved downwards from the position shown the cam surfaces 60 move along the shoulders and gradually lift the valve stem upward to the dotted position shown in Figure 1, thereby opening the faucet.

At full open position the rounded front corner 62 passes approximately in line with the axis of the stem or possibly slightly to the rear and by reason of the tendency of the spring 52 to pull the stem downward locks the valve mechanism in open position with the front curved portion of the handle pressing against the valve body.

In closed position a rear projection 66 on the handle lies against the shoulders 64 and prevents tilting the handle any farther toward a rearward position. On the body a web 68 extends upward through an aperture 70 in the projection 66. The web has a hook-like element 72 at the front end and this hook-like element is designed to project within an aperture 74 in the handle in closed position. There is likewise a hole 76 in the web through which may be inserted a padlock 78 for locking the faucet in closed position.

When the faucet is locked in closed position the hook 72 by engaging the handle within the aperture 74 prevents movement of the handle upward. Therefore, it becomes impossible to lift the valve stem either by inserting a screw driver under the cam surface 60 or by projecting a screw driver or other instrument into the outlet passage of the valve in order to lift the valve from its seat.

The arrangement of parts thus described provides a tamper-proof valve and likewise a valve which is efficient in operation and handy in the sense that it can be locked in a flowing position as well as made with the interior easily accessible when parts wear out and need changing.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A faucet including a body member having outlet and inlet passages, a valve mechanism for opening and closing the faucet, and actuating means for the valve mechanism comprising a stem projecting outward from the body member, a pair of shoulders on opposite sides of the stem, a handle member overlying the stem having side wings pivoted thereto, said wings being extended to form curved cam surfaces adapted to engage the shoulders respectively, a projection on said handle member, and a portion of the body member engageable with said projection in closed position of the valve, means for locking the valve in closed position and interlocking means on the body member and handle member respectively comprising a hooked element on one member and an anchoring element therefor on the other member engageable only in closed position for the valve adapted thereby to fix the position of the stem and attached valve relative to the valve body so that they cannot be displaced while the handle is locked in closed position.

2. A faucet including a body having a threaded inlet end adapted to be inserted into a liquid container to draw off the contents thereof, the combination of an inlet passage to the faucet, an outlet passage at an angle thereto, a valve mechanism for closing the faucet, said mechanism comprising an annular shoulder forming a valve seat in one of said passages, a disc valve cooperable with the seat, a stem extending in axial alignment with said last passage and outwardly of the valve body having a packing for sealing the stem against passage of fluid and a coiled spring acting between the body and valve normally to urge said valve to a seating position, and an actuating means for the valve comprising a handle pivoted to the stem, a shoulder on the valve body adjacent the stem and a cam face on the handle adapted to slide on the shoulder for lifting the valve stem to open said valve, said cam face terminating at an end thereof remote from the pivot and adapted to swing to a position so that the end is in substantial alignment with the center line of the stem in open position for the valve, an extension on the handle adapted to contact the valve body in closed position, a projection on the body adjacent the extension, said projection having an aperture for reception of a lock for simultaneously contacting both said projection and said extension, said handle having anchoring means, and a corresponding anchoring means on the body adapted to engage the anchoring means on the handle in closed position to prevent displacing the valve from its seat when the valve is locked in said closed position.

3. In a faucet including a body having a threaded inlet end adapted to be inserted into a liquid container to draw off the contents thereof, the combination of an inlet passage, a downwardly directed outlet passage, and a chamber communicating between inlet to outlet passages, a valve mechanism for closing the faucet, said mechanism comprising an annular shoulder forming a valve seat in the outlet passage, a disc valve of soft material cooperable with the seat having a rigid backing, a stem on the valve extending upward through the chamber and outwardly of the valve body having a friction packing and a coiled spring acting between the valve body and valve normally to urge said valve to a seating position, and a manual actuating means for the valve comprising a forwardly extending handle, wings at the sides of the handle and pivoted to the stem held therebetween, rearward sloping shoulders on the valve body on opposite side of the stem and a cam face on said wings adapted to slide on the shoulders for lifting the valve stem to open said valve, said cam faces terminating each in a rounded end remote from the pivot and being adapted to swing to a position substantially in line with the center line of the stem in full open position, a slotted extension on the handle adapted to contact the shoulders when the actuating means is in closed position, a hooked web on the body extending upward through the slot, said web having an aperture adjacent the extension for a lock arm and said handle having a hole adapted to receive the hook on the web in closed position to prevent displacing the valve from its seat when the valve is locked in said closed position.

4. In a tamper proof faucet valve including a body member having outlet and inlet passages, a valve mechanism for opening and closing the faucet valve, actuating means for the valve mechanism comprising a stem projecting outwardly from the body member and a handle member pivoted to the stem, the combination of a cam face on the body and a cam having a portion on the handle extending at an angle relative to the face of said cam cooperable therewith for respectively opening the valve and temporarily holding the valve in open position, and means for locking the valve in closed position comprising sets of elements automatically engageable in closed position, an element of each set being located on said body and another element of each set being located on said handle, one of said sets having an engaging position laterally relative to the valve stem to prevent rotation of the handle about the pivot beyond said closed position and another of said sets having an interlocked engaging position in a substantially axial direction relative to the stem to prevent axial movement of the stem and of the handle relative thereto when in locked position, said body and said handle having means to receive a padlock for permanently locking said sets of elements in engaging positions.

5. A tamper proof faucet valve including a body member having outlet and inlet passages, a valve mechanism for opening and closing the faucet valve, actuating means for the valve mechanism comprising a stem projecting outwardly from the body member and a handle member pivoted to the stem, the combination of a cam face on the body and a cam having a portion on the handle extending at an angle relative to the face of said cam cooperable therewith for respectively opening the valve and temporarily holding the valve in open position, means for locking the valve in closed position comprising contacting elements respectively on the body and on the handle having a position of engagement at a location laterally relative to the stem, and a finger extending outwardly from the body having an end portion directed toward the stem, said handle having a recess adapted to fit over the end portion in valve closed position to prevent axial movement of the stem, and said body having an apertured portion overlying the handle adapted to receive a padlock for permanently locking the handle in valve closed position.

6. In a tamper proof faucet including a body member having outlet and inlet passages, a valve mechanism for opening and closing the faucet, actuating means for the valve mechanism comprising a stem projecting outward from the body member and a handle member pivoted to the stem, the combination of interlocking elements respectively on the body member and handle member free from engagement in valve open position and having a point of engagement in substantial alignment with the axis of said stem and respectively automatically engageable whenever said valve is in closed position comprising thereby a lock against axial movement of the valve stem, and locking means respectively forming part of said handle and the valve body free from engagement in valve open position and having a point of engagement comprising a stop located laterally relative to the axis of the valve stem comprising a lock against pivotal movement of the handle when the valve is in closed position.

ROBERT M. MICHAELS.